Figure 1:
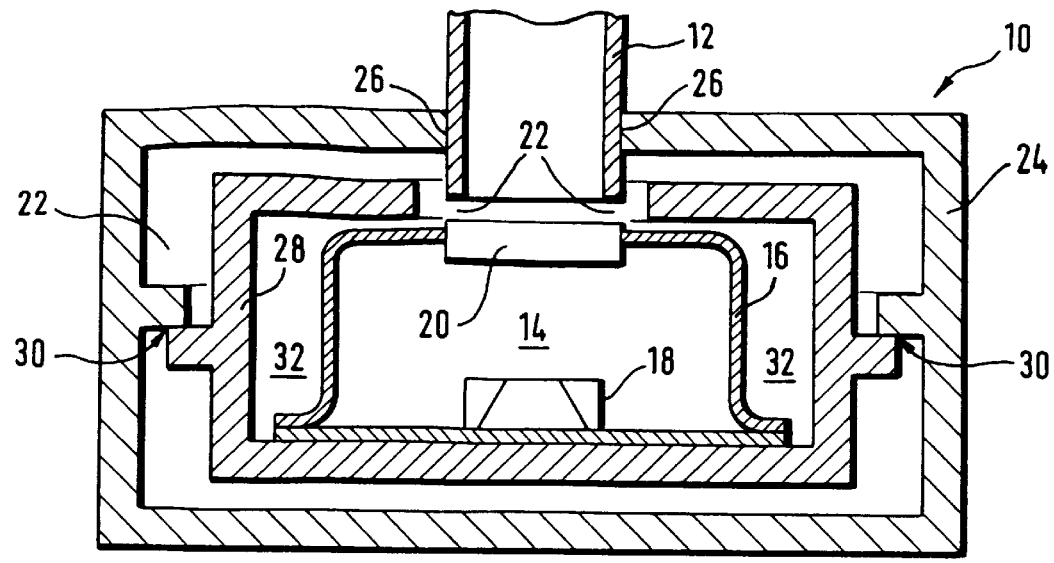

United States Patent [19]
Beerwerth et al.

[11] Patent Number: 6,152,595
[45] Date of Patent: Nov. 28, 2000

[54] MEASURING TIP FOR A RADIATION THERMOMETER

[75] Inventors: Frank Beerwerth, Runkel-Ennerich; Bernhard Kraus, Braunfels; Katja Honnefeller, Friedrichsdorf, all of Germany

[73] Assignee: Braun GmbH, Kronberg, Germany

[21] Appl. No.: 09/180,176

[22] PCT Filed: Mar. 5, 1998

[86] PCT No.: PCT/EP98/01246

§ 371 Date: Oct. 30, 1998

§ 102(e) Date: Oct. 30, 1998

[87] PCT Pub. No.: WO98/44322

PCT Pub. Date: Oct. 8, 1998

[30] Foreign Application Priority Data

Apr. 2, 1997 [DE] Germany ............ 197 13 608

[51] Int. Cl.[7] ............ G01J 5/04; G01J 5/06; A61B 6/00
[52] U.S. Cl. ............ 374/131; 374/132; 374/133; 128/664
[58] Field of Search ............ 374/131, 133, 374/132; 128/664

[56] References Cited

U.S. PATENT DOCUMENTS

| | | | |
|---|---|---|---|
| 2,416,775 | 3/1947 | Sarver | 374/132 |
| 2,811,856 | 11/1957 | Harrison | 374/132 |
| 4,932,789 | 6/1990 | Egawa et al. | 374/131 |
| 5,293,877 | 3/1994 | O'Hara et al. | 374/133 |
| 5,445,158 | 8/1995 | Pompei | 128/664 |
| 5,653,238 | 8/1997 | Pompei | 128/664 |
| 5,857,775 | 1/1999 | Vodzak et al. | 374/131 |

FOREIGN PATENT DOCUMENTS

| | | |
|---|---|---|
| 593415 | 4/1994 | European Pat. Off. . |
| 763349 | 3/1997 | European Pat. Off. . |
| 63-91526 | 4/1988 | Japan . |
| WO 89/04891 | 5/1990 | WIPO . |
| WO 94/02467 | 9/1994 | WIPO . |

*Primary Examiner*—G. Bradley Bennett
*Assistant Examiner*—G. Verbitsky
*Attorney, Agent, or Firm*—Hopgood, Calimafde Kalil & Judlowe

[57] ABSTRACT

The invention is directed to a probe tip (10) for a radiation thermometer in which the infrared radiation to be measured is directed through a waveguide device (12) to a radiation sensor (14) that converts the incident radiation into an electrical output signal from which the target temperature is determined by means of a downstream electronic measurement circuitry. To reduce temperature gradients in the sensor (14), the invention provides for the sensor housing (16) to be thermally coupled to the waveguide device (12) via a thermal coupling arrangement (24, 28, 30), such that the waveguide device is in direct thermal contact with the side of the sensor housing (16) close to the radiation and the opposite side thereof via the thermal coupling arrangement (24, 28, 30). Preferably, the thermal coupling arrangement (24, 28, 30) which is made of a material conducting heat well has substantially its entire surface area in abutting engagement with the corresponding sides of the sensor housing (16). Further, a suitable method for reducing temperature gradients in the housing (16) of the radiation sensor (14) is described. The probe tip (10) of the present invention enables the temperature to be determined accurately also in cases where inhomogeneous heating occurs. Still further, the probe tip is small, of light weight and compact, thus enabling easy-to-handle and user-friendly radiation thermometers to be built as they are conventionally used for measuring the temperature in a person's ear canal.

15 Claims, 1 Drawing Sheet

MEASURING TIP FOR A RADIATION THERMOMETER

This invention relates to a probe tip for a radiation thermometer according to the prior-art portion of claim 1 as well as to a radiation thermometer incorporating such a probe tip. The present application further relates to a method for reducing temperature gradients in the radiation sensor of a probe tip of the prior art.

Radiation thermometers are increasingly used for quick and accurate determination of a person's body temperature. This involves the simple procedure of introducing the thermometer's probe tip into the ear canal in order to measure the infrared emissions from the tympanic membrane which are an accurate indication of the body's temperature and more responsive to changes in temperature than is the case with oral, rectal or axillary measurements. By comparison with conventional clinical thermometers filled with mercury, radiation thermometers have proven to be not only significantly more rapid and accurate, but they also eliminate the risk of communicating infections resulting from contact with mucous membranes as may happen, for example, when oral or rectal measurements are taken with mercury-filled thermometers. In addition, the risk of perforating the rectum is eliminated, a permanent hazard when taking babies and children's temperature with conventional thermometers.

The probe tips of radiation thermometers typically comprise an opening for admitting the infrared radiation to be measured which is directed through an infrared waveguide extending from the opening to a thermal radiation sensor as, for example, a pyroelectric sensor, a thermopile or a bolometer device. This device converts the partial temperature increase produced in the sensor into an electrical output voltage from which the target temperature is determined by means of a downstream electronic measurement circuitry.

When temperature gradients occur in such a probe tip as they may develop, for example, when the probe tip is heated due to contact with the ear canal, measurement errors are frequently introduced because of the sensitivity of thermal radiation sensors unless appropriate countermeasures are taken.

To avoid such erroneous readings, a variety of different methods are known in the art.

Thus, for example, it is proposed in U.S. Pat. No. 4,602,642 to preheat the probe tip of a clinical radiation thermometer to the expected target temperature of about 37° C. prior to taking the measurement in order to thereby minimize temperature gradients between the measuring point which is conventionally the auditory meatus, and the probe tip with the radiation sensor received therein, thereby minimizing the effect of such temperature gradients on the measurement accuracy. However, preheating the probe tip uniformly involves rather an elaborate technique which has a detrimental effect not only on the manufacturing process and the associated cost, but also on the user friendliness of such a probe tip. Moreover, the necessary preheating period is rather long, preventing measurements to be taken readily and making utilization appear impractical because of the attendant high power consumption, in particular where battery-powered radiation thermometers are used.

Another possibility involves integrating the radiation sensor into a large thermal mass so that a heat input results in only a low temperature rise and low temperature gradients. Thus, for example, EP 0 441 866 B1 describes a probe tip in which the sensor sits on a heat sink and the heat from the ear is directed around the sensor into the heat sink, being thus kept away from the sensor. In U.S. Pat. No. 4,895,164 a substantial part of the waveguide together with the sensor device is surrounded by a metal block of sufficient size and good heat conductive properties in order to ensure substantially isothermal conditions. The disadvantage of this approach is, however, that large thermal masses make a thermometer difficult to handle and heavy, so that small pivotal probe tips are not possible. In addition, design and construction constraints are high.

According to the teaching of U.S. Pat. No. 5,293,877, the radiation sensor is thermally insulated from the probe tip, so that a heat input into the probe tip produces only a low temperature rise and low temperature gradients in the sensor. However, when heating of the probe tip occurs, a thermally insulated sensor will adopt a different temperature, therefore measuring also the intrinsic emission of the waveguide and the entrance window. To make allowance for this intrinsic emission, it is therefore necessary to determine, in addition to the sensor temperature, the temperatures of the waveguide and the entrance window as well.

To solve the aforementioned problem, U.S. Pat. No. 5,127,742 proposes performing "null balancing" shortly before and/or after radiation is actually measured using, for example, a shutter, but this adds to the mechanical and electrical complexity.

In U.S. Pat. No. 5,293,877 the temperature gradients occurring in the probe tip or in the sensor are determined by temperature sensors, and suitable allowance is made for such gradients in the calculation of the radiation temperature. However, because of the generally quite small temperature differences, measuring these temperature gradients is rather a complex process. Another disadvantage is the space requirement for the sensors and their leads in the small probe tip. In addition, the complexity of calibration and calculation of the radiation temperature is also increased.

In U.S. Pat. No. 4,722,612 the "sensor offset" is compensated for by a second radiation sensor connected in series opposition to the first and arranged such that it is exposed to temperature gradients but not to radiation. However, double sensors of this type are naturally more expensive and larger than a single sensor.

In document JP 63-91526 according to which the prior-art portion of the present claim 1 is worded, thermal coupling from the waveguide device into the cylindrical side wall of the sensor housing is proposed as a means for reducing the temperature gradients. With this approach, optimum selection of the coupling location which is approximately in the middle of the sensor housing does not only depend on the size and the sign of any temperature gradients that may occur, but in particular also on the special configuration of the sensor housing, in which not only the different thermal capacities of the individual housing parts but also the lateral weld seams typically existing on such sensors play a role, whose thermal conductivity may differ widely between the individual sensors. To obtain good results, it would therefore be necessary in practice to adjust the coupling location individually which would surely involve some manufacturing effort in mass production. In addition, this type of thermal coupling leaves the thermal coupling through the leads of the sensor into the bottom of the sensor housing out of consideration, with the attendant risk of severe measurement errors being introduced. In the document referred to, the presence of temperature gradients is taken into account by a compensation element at the bottom of the sensor housing.

It is an object of the present invention to provide a probe tip for a radiation thermometer, which affords greatest possible ease and economy of manufacture, is of light weight, easy to handle and compact, which enables the temperature to be measured accurately and readily regardless of any temperature gradients that may occur in the probe tip, and which does not have the above-mentioned disadvantages of prior-art devices. A further object resides in the provision of a method for reducing temperature gradients in the housing of a thermal radiation sensor, by means of which erroneous readings attributable to temperature gradients are largely precluded.

In a probe tip according to the present invention, these objects are solved in that an arrangement comprising the radiation sensor and the thermal coupling arrangement is thermally coupled to the waveguide in its thermal center of gravity or thermally neutral area. The term thermal center of gravity or thermally neutral area is understood to be the point or the line or area on the arrangement to which heat can be supplied without producing an inhomogeneous temperature variation of the radiation sensor. The benefit of this is that in the presence of temperature gradients between the waveguide and the radiation sensor, temperature gradients corrupting the measurement result do not occur within the radiation sensor. Still farther, by keeping the thermal capacity of the thermal coupling arrangement at a low level, any temperature differences that may occur between the waveguide and the radiation sensor will balance out rapidly. On the other hand, a high thermal capacity has the advantage that the generally low amount of heat supplied or withdrawn during a measurement due to contact with the object to be measured, for example, does not produce a noticeable temperature gradient within the probe tip.

In the preferred embodiment of a probe tip of the present invention, the thermal coupling arrangement comprises a heat accumulating device and a heat dissipating device which are in direct thermal contact with each other only via a thermal junction while being otherwise thermally insulated from each other, the sensor housing is in thermal contact with the heat dissipating device, and the thermal junction is located in the thermal center of gravity of an arrangement comprised of the radiation sensor and the heat dissipating device. Particularly advantageously, at least two opposed sides of the sensor housing are in direct thermal contact with the heat dissipating device, such that a change in temperature of the sensor housing produces a uniform change in at least the temperatures of these particular sides of the sensor housing. The heat accumulating device is in direct thermal contact with the waveguide device and is preferably thermally insulated from a probe tip housing.

To optimize the transfer of heat, the thermal coupling arrangement is preferably made of a material having good heat conductive properties as, for example, copper, aluminum or zinc, and its thermal mass may be relatively large to reduce the temperature gradients occurring.

Further preferred embodiments of the probe tip of the present invention are claimed in the subclaims, whereas claim 13 relates to a radiation thermometer with a probe tip according to the present invention. A method for reducing temperature gradients in the housing of a thermal radiation sensor is indicated in claim 14 of the invention.

Further features and advantages of the present invention will become apparent from the subsequent description of preferred embodiments in conjunction with the accompanying drawing. In the drawing in which like components are assigned like reference numerals, FIG. 1 is a schematic view of a probe tip of the present invention to illustrate the thermal coupling according to the invention into the housing of the associated radiation sensor; and FIG. 2 is a view of an embodiment of a probe tip of the present invention for a radiation thermometer.

Figure 2:
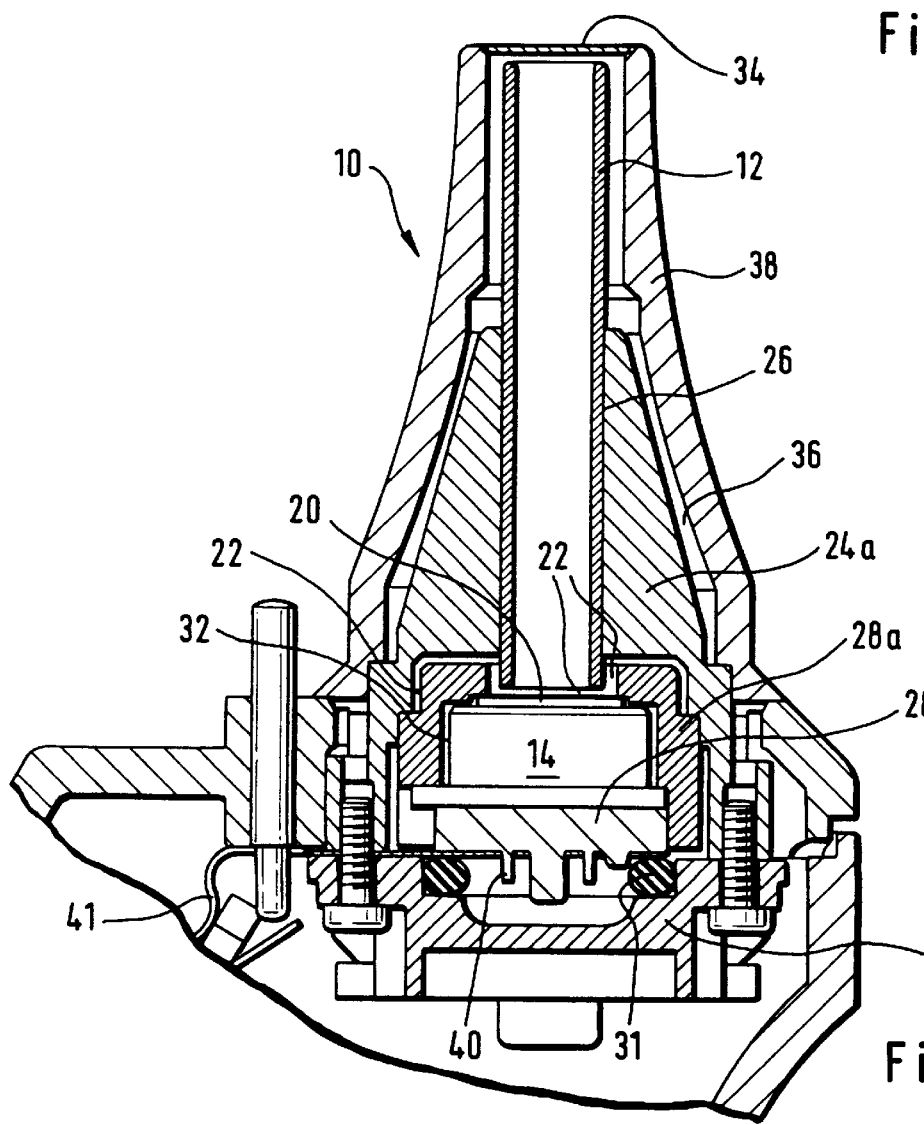

Referring now to FIG. 1 of the drawing, there is shown schematically a probe tip 10 of the present invention for a radiation thermometer. The probe tip 10 comprises a waveguide device 12 for transmitting the infrared radiation to be measured from an entrance opening (not shown) to a radiation sensor or a thermoelectric transducer 14 converting the partial temperature increase produced by the radiation in the sensor into an electrical output signal from which the target temperature is determined by means of a downstream electronic measurement circuitry (not shown).

The radiation or temperature sensor 14 comprises a sensor housing 16 in which thermocouples, for example, are arranged as sensor elements 18 which, via leads (not shown) in the bottom of the sensor housing 16, are connected to the downstream electronic measurement circuitry. The side of the sensor housing 16 close to the incident radiation or the waveguide device 12 is provided with a sensor window 20 for admitting the infrared radiation to be measured. The end of the waveguide device 12 and the radiation sensor 14 are thermally separated from one another by an air gap 22.

The radiation sensor 14 is surrounded by a thermal coupling arrangement 24, 28, 30. The thermal coupling arrangement comprises a heat accumulating or concentrating device 24 which is in direct thermal contact with the waveguide device 12 at the location assigned reference numeral 26. Conventionally, an air gap provides for thermal insulation of the heat accumulating device 24 from a probe tip housing (not shown) towards the outside in order to maintain the heat input at a minimum possible level. Disposed between the radiation sensor 14 and the heat accumulating device 24 is a heat dissipating or distributing device 28 which surrounds the radiation sensor 14 and is thermally insulated from the waveguide device 12 by the air gap 22. The heat accumulating device 24 and the heat dissipating device 28 are thermally insulated from each other likewise by the air gap 22. Direct thermal contact between them exists only via a laterally arranged thermal junction 30. Towards the interior the heat dissipating device 28 is thermally insulated from the sides of the sensor housing 16 by an air gap 32, whilst being in direct thermal contact with the side of the sensor housing 16 close to the incident radiation or the waveguide device 12, that is, the upper side or the lid of the housing 16, and the opposite side thereof, that is, the underside or the bottom of the housing 16. For maximum possible uniformity of heating or cooling of the sensor housing 16, the heat dissipating device 28 has substantially its entire surface area, except for the sensor window 20, in abutting engagement with the above-mentioned sides of the sensor housing 16.

The heat accumulating device 24 and the heat dissipating device 28 are preferably made of a material conducting heat well, as for example, copper, aluminum, zinc or the like, in order to ensure optimum heat transference and rapid adjustment of the thermal equilibrium.

On heating or cooling of the waveguide device 12 or the heat accumulating device 24 by external effect, temperature gradients occur in the components identified. Part of the thermal energy is initially transmitted from the heat accumulating device 24 through the thermal junction 30 to the heat dissipating device 28 which transfers it onwards to the bottom and the lid of the sensor housing 16. The location of the thermal junction 30 and the form of the heat dissipating device 28 are invariably selected such that heat transfer to the bottom and the lid of the sensor housing 16 takes place substantially uniformly so as to prevent where possible any temperature gradients in the radiation sensor 14 that would result in different levels of heating of the cold and hot junctions of the sensor 14 and in a sensor output signal reflecting this situation. This is due to the sensor 14 configuration in which the cold junctions which possess a high thermal capacity are typically coupled directly to the bottom of the sensor housing 16, whilst the hot junctions are located on a thermally insulated membrane with very low thermal capacity and are coupled to the sensor housing 16 only via the membrane, the gas in the sensor housing 16, and by heat radiation.

In the thermal coupling into the sensor housing 16 as disclosed in the present invention, the heat dissipating device 28 is configured and the thermal junction 30 is arranged so as to compensate not only for the customarily relatively large differences between the thermal capacities of bottom and lid, but also for the thermal coupling via the leads of the radiation sensor 14 into the bottom of the sensor housing 16, whereby an accurate temperature measurement is ensured also in cases where inhomogeneous heating occurs.

Because the radiation sensor 14 is in thermal contact with the waveguide device 12 (and, where applicable, also with the window admitting radiation (not shown)) through the thermal coupling arrangement 24, 28, 30, it is not necessary to provide for compensation for the intrinsic emission of the waveguide device 12 (and the window admitting radiation). Nor is it necessary to compensate for null drifts due to temperature variations using a shutter, additional sensors, double radiation sensors or the like. The thermal coupling approach of the present invention also enables inexpensive thermopile or bolometer sensors to be utilized, thus eliminating the need for specifically optimized and expensive special types.

FIG. 2 shows a particular embodiment of a probe tip of the present invention for a radiation thermometer. The probe tip 10 has at its forward end an entrance opening or window 34 for passage of the infrared radiation to be measured which is directed by a waveguide 12 to a radiation sensor 14 that is thermally insulated from the waveguide 12 by an air gap 22.

Along a section identified by reference numeral 26, the waveguide 12 is in thermal contact with a heat accumulating device 24 which, for simplified assembly, is comprised of an upper part 24*a* and a lower part 24 readily joinable together with the upper part 24*a*, the two parts being designed to have a relatively large thermal mass to reduce temperature gradients. To maintain the heat input at a lowest possible level, an air gap 36 provides for thermal insulation towards the outside of the heat accumulating device 24 from a probe tip housing 38 typically made of plastic.

The heat accumulating device 24 surrounds a heat dissipating device equally comprised of two parts 28*a* and 28*b* for ready joining together, from which it is thermally insulated by an air gap 22 except for some points of contact that may exist at the thermal junction. Between the lower part 24*b* of the heat accumulating device and the lower part 28*b* of the heat dissipating device, an elastic O-ring 31 is provided which has poor heat conductive properties and serves to compensate for tolerances or thermal expansion, if any. The upper part 28*a* of the heat dissipating device is thermally insulated from the sides of the sensor housing 16 by an air gap 32, and from the waveguide device 12 by the air gap 22, whilst being in direct thermal contact with the upper side or the lid of the sensor housing 16. The lower part 28*b* of the heat dissipating device has practically its entire surface area in thermal contact with the underside or the bottom of the sensor housing 16 in order to ensure an optimum possible heat transfer.

For further optimization of the heat transfer, the heat accumulating device 24 and the heat dissipating device 28 are made of ea material conducting heat well, as for example copper, aluminum, zinc or the like.

The leads 40 of the sensor 14 are located within the heat accumulating device 24. Via a flexible printed circuit board 41, the sensor 14 is electrically connected to a downstream electronic circuitry (not shown) of the radiation thermometer for evaluation of the electrical output signals produced by the radiation sensor 14. To minimize the heat input via the leads 40, this printed circuit board is of a very thin configuration. For the same reason, it is also designed to be a poor heat conductor and is thermally coupled to the heat accumulating device 24 in close proximity to the O-ring 31.

As becomes apparent from the foregoing, the thermal coupling of the sensor housing 16 to the waveguide device 12 or the surroundings as disclosed in the present invention enables a small, light-weight and compact probe tip to be created for easy-to-handle and user-friendly radiation thermometers in which erroneous readings attributable to temperature gradients are reliably avoided. By reason of its simple structure and the use of low-cost conventional radiation sensors as, for example, thermopiles or bolometers, the probe tip of the present invention has the added benefit of affording ease and economy of manufacture.

What is claimed is:

1. A probe tip (10) for a radiation thermometer having an entrance opening (34) for passage of the radiation to be measured which is directed, through a waveguide device (12) extending from the entrance opening (34), to a radiation sensor (14) that converts the incident radiation into an electrical output signal and comprises a sensor housing (17) which is thermally coupled to the waveguide device (12) via a heat accumulating device (24), a heat dissipating device (28), and a thermal junction (30), characterized in that an arrangement comprising the radiation sensor (14) in thermal contact with the heat dissipating device (28) is thermally coupled to the waveguide device (12) via the heat accumulating device (24) at a thermally neutral location which can be supplied with heat without producing an inhomogeneous temperature variation in the radiation sensor and comprising a thermal junction (30) and said heat dissipating device is otherwise separated from said heat accumulating device.

2. The probe tip as claimed in claim 1, characterized in that the thermal coupling arrangement (24, 28, 30) comprises a heat accumulating device (24) and a heat dissipating device (28) which are in direct thermal contact with each other only via a thermal junction (30) while being otherwise thermally insulated from each other, that the sensor housing (16) is in direct thermal contact with the heat dissipating device (28), and that the thermal junction (30) is located in the thermally neutral location of an arrangement comprised of the radiation sensor (14) and the heat dissipating device (28).

3. The probe tip as claimed in claim 2, characterized in that at least two opposed sides of the sensor housing (16) are in direct thermal contact with the heat dissipating device (28), such that a change in temperature of the sensor housing (16) produces a uniform change in at least the temperatures of said sides of the sensor housing (16).

4. The probe tip as claimed in claim 2, characterized in that the heat accumulating device (24) is in direct thermal contact with the waveguide device (12).

5. The probe tip as claimed in claim 4, characterized in that the heat accumulating device (24), the heat dissipation device (28) and the thermal junction (30), is made of a material having good heat conductive properties.

6. The probe tip as claimed in claim 2, characterized in that the heat accumulating device (24) the heat dissipating device (28) are each comprised of two complementary parts (24a, 24b; 28a, 28b).

7. The probe tip as claimed in claim 2, characterized in that an elastic O-ring with a low thermal conductivity is disposed between the heat accumulating device (24) and the heat dissipating device (28) to compensate for thermal expansion.

8. The probe tip as claimed in claim 2, characterized in that the heat accumulating device (24) has a correspondingly large thermal mass to reduce temperature gradients.

9. The probe tip as claimed in claim 2, characterized in that the heat accumulating device (24) is thermally insulated from the housing by an air gap (38).

10. A radiation thermometer with a probe tip as claimed in claim 1.

11. A method for reducing temperature gradients in the radiation of a probe tip according to claim 1, characterized in that a supply or withdrawal of an amount of heat to or from the probe tip acts upon the radiation sensor via the thermally neutral location of an arrangement comprising the radiation sensor (14) and the thermal coupling arrangement (28).

12. The probe tip according to claim 1, wherein said leads are electrically connected to a printed circuit board having a thin configuration.

13. The probe tip according to claim 12, wherein said printed circuit board has a low thermal conductivity.

14. The probe tip according to claim 12, wherein said leads are thermally coupled to said heat accumulating device in close proximity to said thermal junction.

15. A probe tip for a radiation thermometer, comprising:

a radiation sensor;

a heat dissipating device thermally coupled to said radiation sensor by direct contact therewith;

a waveguide for directing infrared radiation to said radiation sensor; and a heat accumulating device thermally coupled to said heat dissipating device at a thermal junction and otherwise separated therefrom, said thermal junction disposed at a thermally neutral location which can be supplied with heat without producing an inhomogeneous temperature variation in the radiation sensor.

* * * * *